Oct. 27, 1970  T. D. NEWTON  3,536,291

SPOOL VALVE

Filed March 18, 1968

INVENTOR.
THOMAS D. NEWTON

BY
Robert R. Thornton
ATTORNEY

United States Patent Office 3,536,291
Patented Oct. 27, 1970

3,536,291
SPOOL VALVE
Thomas D. Newton, Downey, Calif., assignor to Allied Pacific Manufacturing Company, Compton, Calif., a corporation of California
Filed Mar. 18, 1968, Ser. No. 713,896
Int. Cl. B23q 35/16
U.S. Cl. 251—3
2 Claims

ABSTRACT OF THE DISCLOSURE

A spool valve assembly for the control of hydraulic fluid flow in machine tool tracers. The valve spool utilizes two lands having series of parallel-sided portions offset axially in alternate order. The valve actuator utilizes both flange actuator pivoting to displace the spool and a ball in conical seat on the actuator which is displaced upon actuator pivoting to provide additional spool displacement.

---

Spool valves for utilization in the control of hydraulic fluid flow are well-known, particularly with respect to the control of fluid flow in tracer valves for machine tools. Such a device is, for example, described in U.S. Pat. No. 2,753,145, issued July 3, 1956. Such spool valves as have been used heretofore, while generally satisfactory, have evidenced various shortcomings, such as lack of precise fluid flow rate control for very low flow rates, abrupt opening and closing of the valve resulting in tracer overshoot due to momentum, valve clogging at low fluid flow rates due to "silting," i.e., deposition of particulate matter contained in the fluid on the valve surfaces, chatter at high rates of movement, and the like.

In the invention, a spool valve assembly utilizes a valve body having a cylindrical bore, within which a valve sleeve is disposed. Five ring-shaped recesses are formed in an inner bore of the sleeve so as to be in axial alignment. A valve spool having a hollow central passage is disposed within the valve sleeve such that two spool lands, formed by three ring-like recesses in the spool outer surface, are positioned over the second and fourth sleeve recesses. Each of the lands consists of a plurality of parallel-sided first elements which are axially offset one with respect to another in alternate order. The lands are spaced apart such that the distance between the adjacent land faces does not exceed the distance between the most proximate faces of the second and fourth sleeve recesses and the distance between the outer land faces exceeds the distance between the most remote faces of the second and fourth recesses. The valve assembly has an actuator shaft extending into the spool central passage. A ball seat is formed on the end of the actuator shaft within the spool and an actuator ball positioned in the ball seat. A sleeve ball seat is attached to the valve spool and also urged against the actuator ball so as to hold the ball in the shaft seat. An actuator flange having a spherical radius cross-sectional configuration extends outwardly from the actuator shaft so that the actuator shaft is pivotal with respect to the valve body at the flange outer rim. When the actuator shaft is displaced laterally, the shaft pivots, displacing the shaft ball seat laterally, and thereby displacing the spool longitudinally. The spool displacement results both from actuator shaft pivot and from movement of the actuator ball in the shaft ball seat upon pivoting.

The invention may be more readily understood by referring to the accompanying drawing in which.

Figure 1:
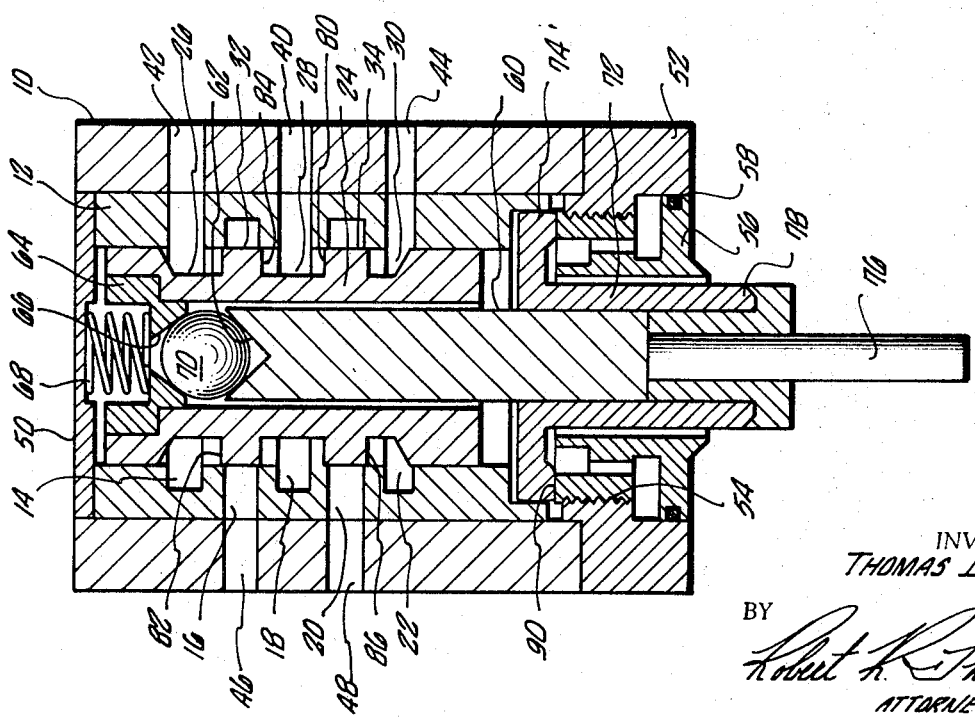
FIG. 1 is a view, in section, of a spool valve assembly according to the present invention.

Referring now to FIG. 1, there is shown a spool valve, in section, utilizing the present invention. The spool valve has a valve body 10 which is provided with a cylindrical bore extending longitudinally therethrough. A valve sleeve 12 is disposed within the bore. As is shown in FIG. 1, the sleeve 12 has five annular or ring-shaped recesses, 14, 16, 18, 20, 22 formed therein in axial alignment with the cylindrical bore. A spool 24 is disposed within the cylindrical bore and, therefore, also within the sleeve 12. The spool 24 has three ring-like recesses 26, 28, 30 formed in its outer surface. The ring-like recesses on the periphery of the spool 24 form a first land 32 and a second land 34. The configuration of the lands will be described more fully hereinafter with respect to FIGS. 2 and 3.

As will be apparent from FIG. 1, the lands 32, 34 are so relatively positioned that they are disposed over the second and fourth sleeve recesses 16, 20, respectively. The valve body 10 has a fluid source inlet passage 40 extending therethrough which opens into the third sleeve recess 18. The valve body 10 has a pair of fluid return passages 42, 44 which open respectively, into the first and fifth sleeve recesses 14, 22. First and second fluid flow passages 46, 48 extend through the valve body 10 and open into the second and fourth sleeve recesses 16, 20.

The cylindrical bore of the valve body 10 is closed at one end by a top cover 50. At the opposite end, a bottom cover 52 is fixed to the valve body. The bottom cover 52 has a cylindrical threaded portion on a retainer 56. An O-ring 58 provides a fluid-tight seal between the bottom cover 52 and retainer 56, while permitting the rotation of the retainer 56 with respect to the bottom cover 52, to move the retainer 56 in or out, as desired.

An actuator shaft 60 extends through the cylindrical bore into a central passage of the spool 24. At the end of the actuator shaft 60 within the spool central passage, a cone-shaped ball seat 62 is formed. A valve ball seat element 64 is attached to the valve spool 24 and has a valve ball seat 66, conical in configuration, formed therein. A coil spring 68 is disposed between the top cover 50 and the valve ball seat element 64 so as to urge the valve ball seat toward the actuator shaft ball seat. An actuator ball 70 is disposed between the ball seats 62, 66. An actuator element 72 having an actuator flange 74 is attached to the actuator shaft 60. A stylus 76 is attached to the actuator element 74 by a stylus collett 78.

As shown in FIG. 1, the spool valve is in a "neutral" position, that is, one in which there is no fluid flow through the valve. In actual operation, the retainer 56 is preferably positioned further away from the top cover 50, by means of its threaded engagement with the bottom cover 52, so as to permit coil spring 68 to position the spool 24 slightly further from the top cover 50. Thus, a flow of fluid will exist, in such a position, from the fluid source inlet passage 40 through the second spool recess 28, past an adjacent second land face 80, into the fourth sleeve recess 20 and out the second fluid flow passage 48. Assuming that the entire fluid system is a closed system, fluid will then flow from the first fluid flow passage 46 into the second sleeve recess 16, past an outer first land face 82 into the first sleeve recess 14 and out the fluid return passage 42.

Similarly, if the spool 24 is displaced toward the top cover 50 from the position shown in FIG. 1, fluid will flow from the fluid source inlet passage 40, past an adjacent first land face 84, into the second sleeve recess 16, and out the first fluid flow passage 46. Fluid will also flow from the second fluid flow passage 48, into the fourth sleeve recess 20, past an outer second land face 86, into the fifth sleeve recess 22, and out the fluid return passage 44. The exact relative dimensioning of the lands and recesses, in order to provide the fluid flow just described, will be explained in more detail with respect to FIG. 2.

In operation, deflection of the stylus 76 in any direction causes the actuator flange 74 to pivot, on an outer portion 90 thereof, against the retainer 56, so as to laterally displace the actuator shaft 60. The lateral displacement of the actuator shaft 60 causes the cone-shaped ball seat 62 to move closer to the top cover 50, thus forcing the spool 24 toward the top cover 50 against the bias of the coil spring 68. However, by using a cone-shaped ball seat, rather than a flange termination of the actuator shaft or the like, an additional displacement of the spool 24 is accomplished by reason of the actuator ball 70, upon the lateral displacement, being forced away from the apex of the cone-shaped ball seat 62, and thus moving toward the top cover 50. This additional actuator ball movement also moves the spool 24. The utilization of the dual actuator structure of the actuator flange 74 and the actuator ball 70 in conjunction with the cone-shaped ball seat 62 produces a greater displacement of the spool 24, and thus greater control over the flow rate of fluid, than would otherwise be obtainable for a given displacement of the stylus 76.

Figure 2:
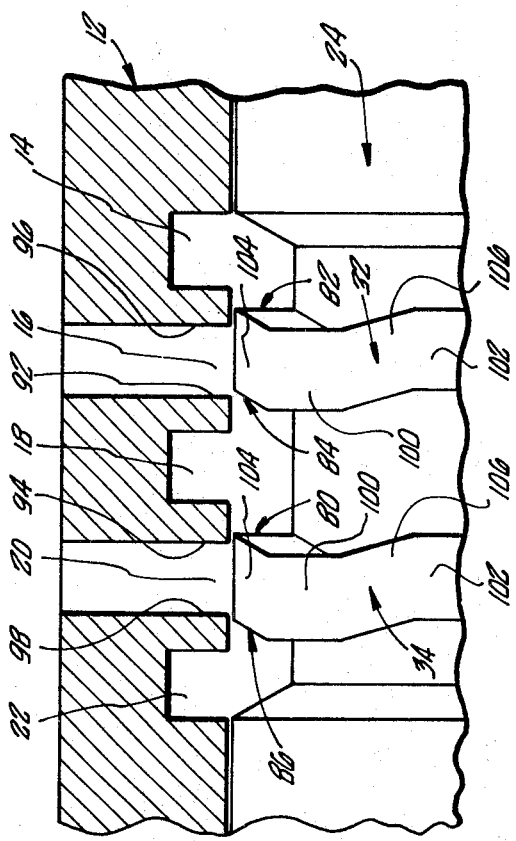
FIG. 2 is a view, partially in section, of a portion of a spool valve assembly as illustrated in FIG. 1.

FIG. 2 illustrates a portion of the valve assembly of FIG. 1 in greater detail. The construction of the spool 24 and more particularly the lands 32, 34 thereof, and their relative disposition with respect to the recesses, 14, 16, 18, 20, 22 is shown in exaggerated form to better illustrate one of the features of the invention. A lateral displacement of the spool 12, toward the top cover 50 (not shown) will cause the first and second lands 32, 34 to move relative to the second and fourth recesses 16, 20, so that fluid may flow between the fourth and fifth recesses 20, 22, with respect to the outer second land face 86, and between the second recess 16 and third recess 18, with respect to the adjacent first land face 84.

As has been described heretofore, movement in the opposite direction will permit fluid flow past the outer first land face 82 and adjacent second land face 80, respectively, between the first and second recesses 14, 16 and the third and fourth recesses 18, 20. It will be noted that the width of each of the lands 32, 34 is greater than the width of the recesses. Therefore, a "null" position exists during which all fluid flow between the various recesses is shut off.

FIG. 2 also illustrates another important feature of the present invention, i.e., the relative dimensions between the adjacent faces 80, 84 and the outer faces 82, 86 with respect to the spacing between a face 92 of the second recess and a face 94 of the fourth recess, the most proximate faces of the second and fourth recesses, and a face 96 of the second recess and a face 98 of the fourth recess, the most remote second and fourth recess faces. The spacing between the adjacent land faces 80, 84 is less than the spacing between the proximate second and fourth recess faces 92, 94, while the spacing between the outer land faces 82, 86 is greater than the spacing between the remote recess faces 96, 98. By using such a structure, the fluid flow which exists in either the first recess 14 or the fifth recess 22, which is a "return" fluid flow, will be terminated by the respective land face 82, 86, prior to termination of flow through the second recess 16 or fourth recess 20 of inlet fluid from the third recess 18. This feature is illustrated in FIG. 2, which shows the land 86 to have closed the passage between the fourth recess 20 and fifth recess 22 while the land 84 has not yet closed the passage between the second recess 16 and third recess 18.

Figure 3:
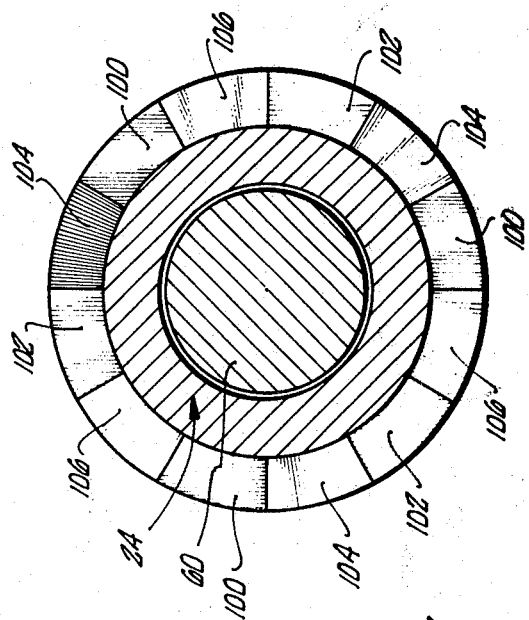
FIG. 3 is a view, partially in section, of a valve spool according to the present invention.

Also shown, in part, in FIG. 2 is the configuration of the lands 32, 34. As is seen in FIG. 2, each land consists of parallel-sided portions which are offset one with respect to another. More particularly, it will be seen in FIG. 2 that each land consists of pairs of parallel-sided first land elements 100, 102 and parallel-sided second land elements 104, 106. The first land elements 100 are offset axially, with respect to the first land elements 102. However, all of the sides of the land elements 100, 102 lie in parallel planes which are mutually perpendicular to the axis of the bore extending through the valve body, which axis is coincident with the axis of the central passage of the valve sleeve. The second land elements 104, 106 are each also parallel-sided. However, the planes in which the parallel sides of the elements 104 lie intersect the planes of the sides of the first land elements 100, 102. The planes of the parallel sides of the second land elements 106 intersect the planes of the land elements 100, 102. Also, the planes of the parallel sides of the land elements 104 intersect the planes of the parallel sides of the lands 100, 106. Thus, it will be seen that the land elements are disposed in an offset axial alignment and in an alternate sequence. For a particular spool element, such as shown in the present invention, the land configuration may be, for example, the sequence of dwell-fall-dwell-rise in a 120° arc, repeated three times to produce the complete land. Such a configuration is illustrated in FIG. 3, in which the land elements 100 and 102 occupy dwell positions, the land elements 104 occupy fall positions and the land elements 106 occupy rise positions.

By way of specific example, the spool may be one and one-half inches in outer diameter with a three-quarter inch bore extending therethrough. The recesses may be two-tenths of an inch in depth, the land adjacent faces spaced forty-seven hundredths of an inch apart and the outer land remote faces spaced one and thirty-two-thousandths of an inch. For such a spool, appropriate valve sleeve dimensions are fifty-one-hundredths of an inch spacing between the most proximate faces of the second and fourth sleeve recesses and one inch spacing between the most remote faces of the second and fourth recesses.

As was mentioned heretofore, in normal operation, the retainer position is adjusted such that a flow of fluid normally exists through the valve. When used in a tracer assembly, this fluid flow from the valve assembly is applied to a hydraulic drive cylinder, at one end thereof. Fluid from the opposite end of the hydraulic cylinder is returned to the spool valve through the appropriate fluid flow passage and passes from the valve through the appropriate return passage to a sump or the like. This positioning of the spool causes the tracer slide to be moved by the cylinder in the forward or "in-feed" position until the stylus contacts the template. Contact with the template deflects the stylus and actuator, thereby displacing the spool toward the top cover so as to slow or stop fluid flow. After the spool has been displaced sufficiently to reach the shut-off or null position, pressure is balanced on each side of the hydraulic cylinder. The slide, whose position is controlled by the cylinder, will be at rest.

This rest condition will exist until the stylus reaches a higher or lower position of the template. In case of a rise in the template surface, the stylus will be deflected further, causing the spool to be further displaced toward the top cover to permit the flow of the fluid in the opposite direction from the initially existing. This will cause the tracer slide to move in reverse direction until the rise in the template is cleared. If the stylus encounters a recess in the template, the displacement of the spool valve in response to the bias spring initiates, once again, the flow of fluid for the "infeed" motion which existed originally.

Although not shown, a manual override for the stylus may be provided by utilization of a cam surface or the like which will displace the spool toward the top cover so as to initiate fluid flow in a return, rather than infeed position.

The spool specifically described herein has been described as having lands, each of which utilizes three sets of land elements 100, 102, 104, 106. Such a configuration provides three metering dwells for each land, each metering dwell being 30° in length. The number and length of the rises, falls and dwells can be varied to provide various operating characteristics. However, a minimum of two and preferably three sets of land elements should be utilized to provide satisfactory operation. Such embodiments overcome many of the operational difficulties which are inherent in the utilization of conventional devices.

The invention claimed is:
1. A spool valve assembly comprising:
   a valve body having a cylindrical bore;
   a valve sleeve disposed in the bore and having five ring-shaped recesses formed therein in axial alignment with the cylindrical bore;
   a spool having a hollow central passage and disposed in the bore for reciprocation therein, said spool having three ring-like recesses formed therein so as to form first and second lands positioned over the second and fourth sleeve recesses, said lands consisting of a plurality of parallel-sided first land elements, axially offset one with respect to another in alternate order and whose sides lie in parallel planes which are mutually perpendicular to the bore axis, adjacent ones of said first land elements being connected together by parallel-sided second land elements lying alternately in two intersecting planes which intersect the parallel planes, said lands being formed and spaced apart such that the distance between the adjacent first and second land faces does not exceed the distance between the most proximate faces of the second and fourth sleeve recesses and the distance between outer first and second land faces exceeds the distance between the most remote faces of the second and fourth recesses;
   a fluid source inlet passage connected to the third sleeve recess;
   first and second fluid return passages connected to the first and fifth sleeve recesses, respectively; and
   first and second fluid flow passages connected to the second and fourth sleeve recesses, respectively.
2. The valve assembly of claim 1, and including actuator means comprising:
   an actuator shaft extending into the spool central passage;
   an actuator shaft ball seat formed at one end of the actuator shaft so as to be disposed within the central passage;
   a valve sleeve ball seat attached to the sleeve and positioned in the central passage opposite the actuator shaft ball seat;
   an actuator ball positioned between the ball seats;
   a retainer connected to the valve body so as to close the valve bore and through which the actuator shaft extends;
   an actuator flange having a spherical radius cross-sectional configuration extending outwardly from the actuator shaft, said flange resting on the retainer within the cylindrical bore; and
   bias means for urging the sleeve ball seat toward the shaft ball seat so that the actuator ball contacts the ball seats.

References Cited
UNITED STATES PATENTS

| 2,130,109 | 9/1938 | Turchan | 251—3 X |
| 2,958,340 | 11/1960 | Rosebrook | 137—625.69 |
| 3,026,680 | 3/1962 | Evans | 251—3 |

FOREIGN PATENTS

| 2,195 | 7/1909 | Great Britain. |

WILLIAM F. O'DEA, Primary Examiner

R. GERARD, Assistant Examiner

U.S. Cl. X.R.
137—625.3, 625.69